Dec. 28, 1948.  H. L. BOOTH  2,457,440
METHOD FOR PRODUCING TUFTED PLASTIC COMBS
Filed June 5, 1947
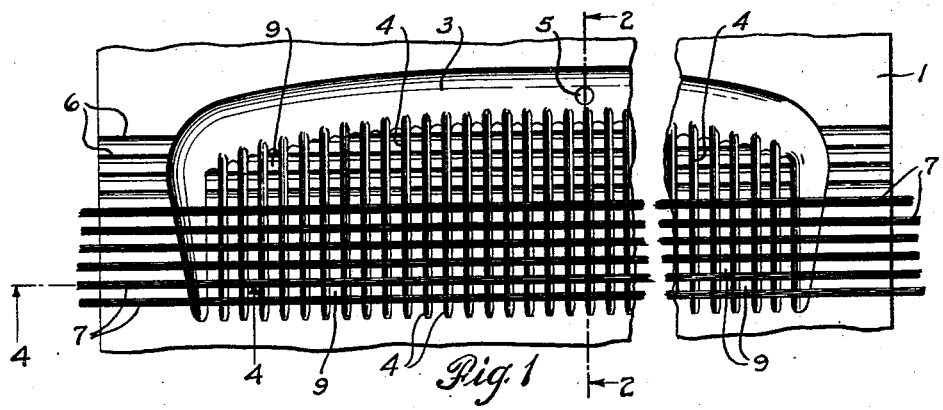
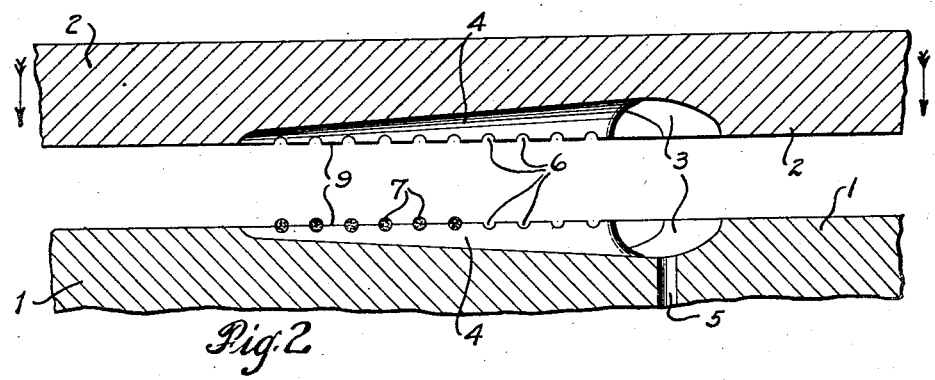
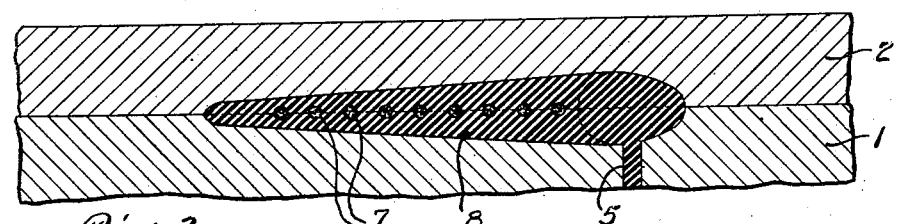
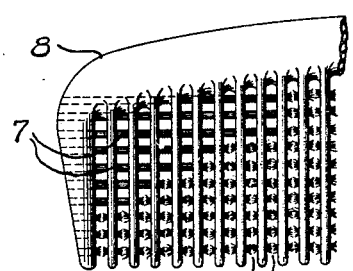
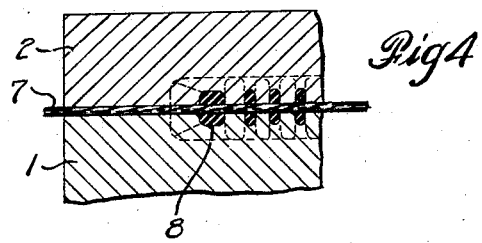
INVENTOR.
Herbert L. Booth
BY
Morgan, Finnegan + Durham
ATTORNEYS.

Patented Dec. 28, 1948

2,457,440

UNITED STATES PATENT OFFICE 2,457,440

METHOD FOR PRODUCING TUFTED PLASTIC COMBS

Herbert L. Booth, Staten Island, N. Y.

Application June 5, 1947, Serial No. 752,755

4 Claims. (Cl. 18—59)

This invention relates to methods for producing molded tufted plastic articles and relates more particularly to such methods and apparatus for the production of molded tufted plastic combs.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Combs and similar articles of plastic are usually made by injection of liquid plastic at high temperature and pressure into metal moulds, usually made in two halves and containing suitable cavities contoured to the shape of the article to be produced. One half of the mould is fixed, one half is movable. The cavities are usually arranged so that several articles may be made with one injection. After injection and cooling, the movable half of the mould is drawn back and the moulded article or articles removed. When the mould is clear, the movable portion is pressed against the fixed portion and held there under pressure during the following injection process.

In my co-pending application Serial Number 656,711 filed March 23, 1946, now Patent No. 2,436,548 there is disclosed a molded plastic comb having parallel rows of tufts between the teeth, projecting from and at right angles to them. As disclosed therein, one way to produce the tufts is to drill holes through the teeth from end to end of the comb, pull compacted cords through the holes, fix the cords frictionally in place by heat and pressure at the right points on the teeth, and then sever the cords between the teeth.

An object of this invention is to reduce and simplify the operations involved in the above method and to obtain more positive frictional holding for the tufts.

Another object of this invention is to provide a new and improved method for producing molded tufted plastic articles, particularly molded tufted plastic combs.

In accordance with this invention as applied to the production of a molded tufted plastic comb, longitudinal semi-circular cavities are provided in each half of the mold, opposite each other, so that when the mould is closed, there will be a series of holes in the mould running lengthwise of the comb. With the mould open, compact, stiff cords of the tuft material are laid in the semi-circular cavities of the fixed part of the mould. When the movable part is pressed in place, the cords will pass through the cavities for the teeth but will be firmly gripped by the parts of the mold between the teeth.

Hot liquid plastic is then injected into the mould cavities and flows around the portion of the cords extending through the teeth cavities. The plastic will flow little, if any, into the mould cavities between the teeth since they will be filled with cord. The cords are not disturbed by the passage of plastic during the flow period of the injection process nor by the high pressure applied at the finish of the process since the pressure will be on all sides of the cords.

After the plastic has set, the mould is opened and the comb is removed, the comb having transverse tuft-cords, securely embedded in the teeth but exposed between the teeth. To finish the comb requires the usual finishing operation plus only severance of the cord between the teeth to form tufts and removal of any plastic material that might have traveled along the cords in the mould.

It will be understood that the foregoing general description and the following detailed description as well are exemplary and explanatory of the invention but are not restrictive thereof.

Of the drawings:

Figure 1 is a fragmentary view in plan of the fixed half-section of a typical and illustrative embodiment of a mould for forming a tufted comb in accordance with this invention, the view showing a series of tuft cords disposed in some of the cord cavities;

Figure 2 is a view in section taken along the line 2—2 of Figure 1 showing the fixed and movable half-sections of the mould in open position as they would appear with some of the tuft cords in installed position;

Figure 3 is a view in section corresponding to the showing in Figure 2 but with the mould sections in closed position, with the mould cavity filled with plastic and with tuft cords in all of the cord cavities;

Figure 4 is a view in section taken along the line 4—4 of Figure 1 of the fixed and movable half-sections of the mould in open position; and Figure 5 is a fragmentary view in plan of a tufted comb fabricated in accordance with this invention, the view showing the tuft cords in both severed and unsevered condition.

In accordance with the illustrative embodiment of the invention, the fixed and movable half-sections 1 and 2, respectively, of a mould are provided each with a mould cavity contoured suitably to form together, as here preferably embodied, a comb cavity having the rim-forming portions 3 and the teeth forming portions 4. Suitable means are provided for injecting hot liquid plastic into the mould cavity in the form of a sprue 5 in one of the mould half-sections, such means and its or their arrangement, disposition and use being well understood by those skilled in the art.

A number of cord cavities 6, each preferably of semi-circular contour, are formed in the respective mould sections, each cavity being adapted to receive a stiff, compact tuft-forming cord 7; as indicated in Figure 1. Each of the cord cavities 6 in one section of the mould has a counterpart in opposition thereto in the other mould section so as together to form in the closed position of the mould a passageway traversing the mould within the confines of the mould cavity and preferably to the opposite ends of the mould. As shown in Figure 1, ten of these cord cavities 6 are provided, each paralleling the other for the full length of the mould and each providing a series of aligned openings through the mould material in the solid inter-tooth portions 9 of the mould.

In accordance with the invention also, the stiff tuft-forming cords 7 each of which may be, for example, a compact twisted bundle of relatively stiff animal hair filaments or other suitable fibrous or bristle material, are disposed each in a separate cord cavity 6 of the fixed mould section 1, as indicated in Figure 1. When all of the cavities have been filled, the mould sections are brought together as shown in Figure 3 and a suitable plastic material injected into the mould cavity under pressure through the sprue 5 to fill all the spaces and to produce, when set, the comb 8, as in Figure 3. During the injection process, the hot liquid plastic will flow around the portion of the cords extending through the tooth cavities 4. However, since the cords will be firmly gripped by the mould parts 9 between the teeth cavities 4, little, if any, plastic will flow into the cord cavities 6 filled with cord.

When the plastic has set, the mould may be opened and the comb 8 removed. In this condition, it will have the transverse tuft cords 7, securely embedded in the teeth but exposed between the teeth as depicted by the two top rows of cords 7 in Figure 5. To finish the comb, all of the tuft cords 7 are severed between the teeth to produce the tufts 10 extending toward each other in the intertooth spaces such as are shown in Figure 5. Any plastic material that may have traveled along the cord in the mould may be removed when the comb is subjected to the usual finishing operations applied to moulded plastic articles.

Although the cord cavities 6 are shown as extending beyond the comb cavity to the ends of the mould, it will be understood that they may terminate at the terminal teeth-forming portions 4 of the comb cavity, if desired. In the former case, the construction permits the cords 7 to extend beyond the mould ends which is advantageous to permit holding and tensioning of the cords, when placing them in the mould, as by means of a suitable cord-holding frame (not shown) in which the cords may be assembled beforehand, if desired. In the latter case and particularly where the cords are relatively stiff, they may be disposed in the cord cavities without tensioning.

The invention in its broader aspects is not limited to the specific mechanisms shown and described but departures may be made therefrom within the scope of the accompanying claims without departing from the principles of the invention and without sacrificing its chief advantage.

What is claimed is:

1. The method of making an injection molded toothed article whose teeth are provided with opposed tufts in the inter-tooth spaces, which method comprises providing a sectional injection mold having an article molding cavity and a row of substantially co-axially aligned openings forming a connecting passageway in said mold between successive tooth-forming portions of said cavity; disposing a length of tuft-forming cord of substantially the same cross-sectional area as said openings in and lengthwise of said passageway thereby to seal said openings; filling said cavity with a settable liquid plastic; removing the article when the plastic has set; and, severing the tuft-forming cord in the inter-tooth spaces to form the opposed tufts.

2. The method of making an injection molded comb whose teeth are provided with opposed tufts in the inter-tooth spaces, which method comprises providing a sectional injection mold having a comb cavity and a row of substantially co-axially aligned openings forming a connecting passageway in said mold between successive tooth-forming portions of said cavity; disposing a length of tuft-forming cord of substantially the same cross-sectional area as said opening in and lengthwise of said passageway thereby to seal said openings; filling said cavity with a settable liquid plastic; removing the comb when the plastic has set; and, severing the tuft-forming cord in the inter-tooth spaces to form the opposed tufts.

3. The method of making an injection molded comb whose teeth are provided with opposed tufts in the inter-tooth spaces, which method comprises providing a sectional injection mold having a comb cavity and substantially parallel rows of openings, each said row forming a separate connection passageway in said mold between successive tooth-forming portions of said cavity; disposing separate lengths of tuft-forming cord in and lengthwise of the respective passageways thereby to traverse said tooth-forming portions from end to end of said cavity and within the confines thereof, each of said cords being of substantially the same cross-sectional area as the openings of the row in which it is disposed thereby to said openings; filling said comb cavity with a settable liquid plastic; removing the comb when the plastic has sufficiently set; and, severing the tuft-forming cords between the comb teeth to form the opposed tufts.

4. The method of making an injection molded comb whose teeth are provided with opposed tufts in the inter-tooth spaces, which method comprises providing an injection mold having a pair of molding sections adapted for relative movement between an open position wherein they are in spaced relation and a closed position wherein they are in abutting relation, each section of said pair having a recessed molding surface portion forming with the other section of said pair in the closed position an internal comb molding cavity and parallel rows of openings, each row providing a passageway connecting successive tooth-forming portions of said cavity; disposing a length of compacted tuft-forming cord in each row of opening forming recesses of one of said sections while the mold is in open position, each of said cords being of substantially the same cross-sectional area as the openings of its row so as to seal said openings with the mold in closed position; closing said mold; filling said comb cavity with a settable liquid plastic under pressure; opening said mold when the plastic has sufficiently set and removing the comb formed; and, severing the tuft-forming cord between the comb teeth to form the opposed tufts.

HERBERT L. BOOTH.

REFERENCES CITED

The following references are of record in the file of this patent:

UNITED STATES PATENTS

| Number | Name | Date |
|---|---|---|
| 1,019,166 | Lorimer | Mar. 5, 1912 |
| 2,203,787 | Husted | June 11, 1940 |
| 2,212,118 | Handforth et al | Aug. 20, 1940 |